United States Patent [19]

Fortier et al.

[11] Patent Number: 4,504,249
[45] Date of Patent: Mar. 12, 1985

[54] H-KEY ADJUSTABLE PULLEY

[76] Inventors: Yvon Fortier, 102 Laflamme St.; Jean-Pierre Fortier, 132 Chouinard St., both of Ste. Claire, Dorchester, Co., Canada, G0R 2V0

[21] Appl. No.: 376,015

[22] Filed: May 7, 1982

[30] Foreign Application Priority Data

Apr. 22, 1982 [CA] Canada ................... 401482

[51] Int. Cl.[3] ............................................. F16H 9/18
[52] U.S. Cl. ..................................... 474/33; 403/358; 411/217; 411/255; 411/315; 474/39; 474/42
[58] Field of Search ....................... 474/24, 32, 33, 37, 474/39, 42, 903; 403/318, 319, 356, 358; 411/200, 209, 210, 211, 217, 221, 254, 255, 315

[56] References Cited

U.S. PATENT DOCUMENTS

| 827,023 | 7/1906 | Knoener | 403/358 |
| 2,519,723 | 8/1950 | Wearn | 474/39 |
| 2,577,516 | 12/1951 | Firth | 474/42 X |
| 2,633,031 | 3/1953 | Browning | 474/33 |
| 2,641,981 | 6/1953 | Pilsner | 474/33 X |
| 2,855,787 | 10/1958 | Kumro et al. | 474/33 |
| 3,250,553 | 5/1966 | Detwiler | 403/358 |
| 3,661,023 | 5/1972 | Maurey | 474/33 |
| 3,680,404 | 8/1972 | Firth | 474/33 |
| 3,815,432 | 6/1974 | Maurey et al. | 474/43 |
| 3,863,514 | 2/1975 | Jensen | 474/33 X |

FOREIGN PATENT DOCUMENTS

| 452334 | 5/1913 | France | 474/39 |
| 598757 | 12/1925 | France | 474/32 |
| 606254 | 6/1926 | France | 474/33 |
| 478 | of 1906 | United Kingdom | 474/39 |
| 28097 | of 1909 | United Kingdom | 474/39 |

OTHER PUBLICATIONS

"Product Engineering", vol. 3, Sep. 1932, p. 385, Variable Pitch Diameter Texsteel Sheave.

Primary Examiner—Leslie A. Braun
Assistant Examiner—Dwight G. Diehl
Attorney, Agent, or Firm—Ezra Sutton

[57] ABSTRACT

An adjustable pulley construction including a first disc having a belt-engaging surface and a centrally located, internally threaded annular hub, the hub having an exterior flat face and an interior recess; and a second disc having a belt-engaging surface and a centrally located annular externally threaded axle, the annular hub of the first disc being coaxially with and movable relative to the axle. The belt-engaging surfaces are positioned in facing relationship to receive a pulley belt therebetween. Securing elements for maintaining a desired space relation between the discs, the securing elements include: a threaded bore disposed in the hub transverse to the axle, a set screw received in the bore, a longitudinal keyway in the hub communicating with the bore, a keyway land provided on the axle in line with the set screw, and a generally H-shaped key. The key is positioned within the recess in the hub and engaged by the set screw to provide a frictional clamping action of the key onto the keyway land. One arm of the key projects beyond the exterior flat surface of the hub and the second arm projects inwardly into an interior recess, the length of the second arm being greater than the width of the keyway recess, thus retaining the key within the recess upon removal of the screw.

20 Claims, 7 Drawing Figures

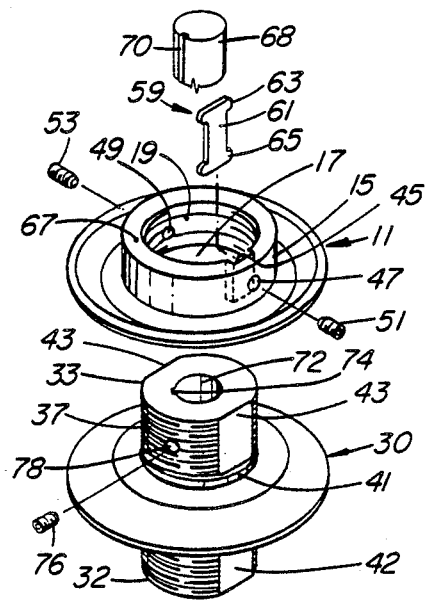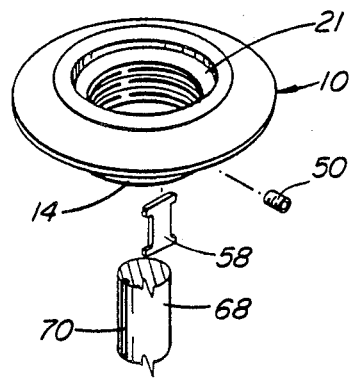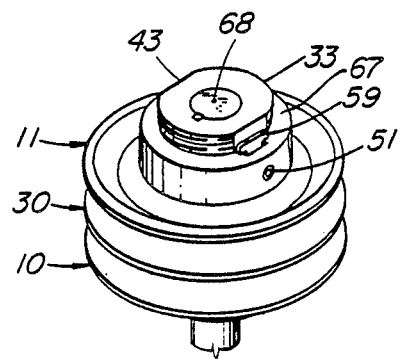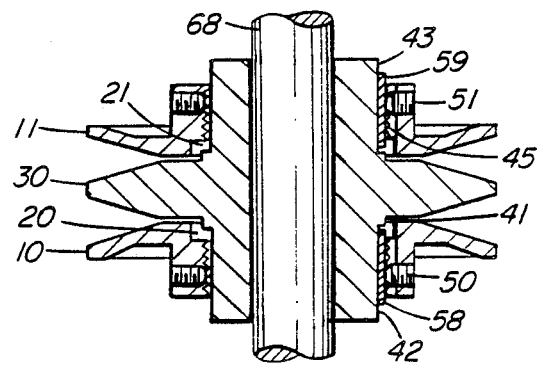
FIG. 5
FIG. 6
FIG. 7

H-KEY ADJUSTABLE PULLEY

BACKGROUND OF THE INVENTION

1. Field of the Invention

This invention relates to an adjustable pulley construction. It is particularly directed to a pulley construction having adjustable flange members whereby the belt-receiving groove defined by the flange members can be changed, thereby to vary the performance of the pulley.

2. Description of the Prior Art

In an increasing number of applications, relatively high horse power motors are being employed, for example, in applications which require the movement of air, as in industrial heating and cooling systems, relatively large fans are utilized and these required V-belts carry as much as 15 HP. Often the fans will be driven by means of 2-groove variable pitch pulleys. For example, in heating and ventilating applications, a motor of a particular horse power may be designated for use. The output shaft of the motor will ordinarily be utilized for driving a belt which in turn will drive blowers. The performance of the blowers will affect the operating characteristics of the heating and ventilating systems.

Pulleys used for supporting drive belts will determine the blower speeds since the relationship between the diameter of the drive shaft pulley and blower shaft pulley will control the blower shaft speed. In order to permit adjustment of the blower shaft speed to thereby adjust the heating and ventilating operation, adjustable pulleys have been proposed. These pulleys are provided with belt supporting flange members with the spacing between the flange members determining the pitch diameter of the pulley. Thus, if the spacing is increased, the pulley belt will move closer to the pulley axis and, therefore, the pulley will have a smaller effective diameter. By providing pulley constructions which are infinitely adjustable, the heating and ventilating system can be set for most efficient operation.

As capacity requirements increase, the demands on pulley structures have also increased. In many applicaions, belts are required to carry as much as 20 HP and this has led to certain mechanical difficulties where variable pitch pulleys are employed. Usually, such pulleys included a pair of opposing discs, each having an independent hub with the hubs being relatively movable so that the spacing between the pulley discs can be varied. In the usual case, set screws were utilized for securing the hubs of the discs once the desired spacing had been set for a particular application. In some instances, such set screws have, however, been found to be incapable of holding the hubs where high horse powers are involved. In some instances, the common set screw approach has resulted in failure in applications requiring only 7½ HP per belt.

Another type of usual pulley structure is comprised of a pair of opposed cone dics or pulley halves which cooperate with a V-belt, the variation in effective pitch diameter being obtained by adjusting the axial spacing of the pulley halves on a supporting shaft or sleeve. By moving the pulley halves close together, the belt is caused to move radially outwardly along the conical faces of the pulley halves, thereby producing an increased pitch diameter. When the pulley halves are drawn apart, the belt moves radially inwardly along the faces of the pulley halves to decrease the effective pitch diameter. In drive systems in which the driving and driven pulleys operate on fixed shaft center distances, the driving pulley is customarily provided with a mechanical actuating mechanism for effecting relative movement between the pulley halves.

Although adjustable pulley constructions provide the most effective means for use with heating and ventilating systems, difficulties still characterize such pulleys. The structure thereof is often relatively complex leading to increased costs. Providing adjustable pulley constructions which are securely held on a shaft can also be a problem. Finally the pulley constructions which are adjustable without undue effort are not easily obtained.

Green in U.S. Pat. No. 602,287 patented Apr. 12, 1898 provided a foreshadowing of the basic concept of the adjustable pulley construction with which the present invention is concerned by providing journal-boxes that are used on heavy and fast-running machinery. The box in the patented improvement was so constructed that any wear of either the box or the shaft could be easily and quickly taken up. this construction assured a perfect fit and nice adjustment between the shaft and the journal-box. The construction included an open bushing surrounding the shaft and concentric therewith, in combination with an open eccentric collar fitting inside the journal-box and means for closing said collar around the bushing.

Browning in U.S. Pat. No. 2,010,451 patented Aug. 6, 1935 provided a bushing having shank and flange parts. The bushing shank part had an external keyway, with a key positioned in the keyway and extending into the zone of the bushing flange part, the flange part having an opening receiving the extending key part, the key and bushing having aligned openings radially extending in the zone. Means were arranged in the opening to secure the key against motion along the keyway.

Fuchslocher in U.S. Pat. No. 2,555,189 patented May 29, 1951 provided variable pitch V-pulleys, wherein and whereby the parts of the pulley could be adjusted to and from each other to increase the belt space therebetween, and whereby the parts could be quickly and effectively secured to the shaft on which they were mounted. He provided the combination with a shaft, of an externally threaded bushing, the bushing having a channel formed in its outer side, whereby the wall of the bushing in the bottom of the channel is made thinner, to be flexed. Two pulleys parts, each having a hub portion are threaded on the bushing and are movable toward and from each other thereon by turning on the threads. A setscrew is inserted through each hub portion of the pulley parts and extends into the channel and against the bottom of the channel. Tightening the setscrew flexes the wall into frictional holding engagement with the shaft.

Jackson in U.S. Pat. No. 2,779,202 patented Jan. 29, 1957 provided a multiple sheave for V-belts and the like wherein one or more V-belts could be engaged with a sheave carried on a drive shaft or similar member. The sheave included a plurality of members each comprising a disc-shaped body portion having a center bore and having a peripheral section of frusto-triangular shape in cross-section. A hub portion was provided on one lateral face of the body portion, with the body portion having a set of bores therein parallel to the center bore at equally spaced circumferential portions thereof. The body portion also had a set of tapped holes therein at equally spaced circumferential portions thereof intermediate and of the same size as the set of bores, the set of tapped holes being equal in number to the set of bores. A pair of diametrically opposed keyways were provided in the center bore, with one keyway being spaced circumferentially from an adjacent one of the set of bores the same distance as the other keyway is spaced from the adjacent one of the set of tapped holes.

Trofimov in U.S. Pat. No. 3,491,608 patented Jan. 27, 1970, provided an adjustable pulley having a control shaft which was supported in an improved manner against axial deflection with respect to an inner shaft or sleeve on which the fixed pulley face was mounted. The movable pulley face had an elongated hub slidable on the inner sleeve or shaft and an outboard end supported by the control shaft. The mounting of the control shaft prevented axial deflection thereof and assured that the various parts of the pulley, including the inner shaft or sleeve, the movable pulley face and the control shaft, would be coaxial and would run true during use so as to minimize or eliminate misalignment and uneven wear of the drive belt. Further, the outboard end of the movable pulley face was supported in such a manner as to minimize the loading on the bearings, thereby improving the life of the pulley. The pulley could be relatively easily and inexpensively manufactured because of the fact that the tolerance requirements, particularly of the bearings and the bearing supporting surfaces, were said to be not as great as in conventional constructions.

Firth in U.S. Pat. No. 3,680,404 patented Aug. 1, 1972 provided a variable pitch sheave which was formed of two discs each having a belt-contacting surface and a hub. The hubs had screw threaded interfit, with the threads of the inner hub being interrupted by at least one abutment surface, and the other hub having at least one radial screw threaded bore to receive a set screw to press against an abutment surface of the inner hub. The inner hub was split at two points spaced from the abutment surface, and its disc was split on one radius only thereof. Tightening of the set screw when the discs were in selected laterally spaced relation while the inner hub was mounted on a shaft, served the dual purpose of preventing relative rotation of the hubs to maintain the selected spacing of the disc and of clamping the inner hub upon the shaft.

Maurey in U.S. Pat. No. 3,661,023 patented May 9, 1972 provided an adjustable pulley construction comprising a pair of discs each having a centrally located hub and defining opposed belt engaging surfaces. The hubs were threaded or otherwise designed for relative axial movement whereby the distance between the belt engaging surfaces could be adjusted. Means were provided for securing the hubs together including a set screw located in a threaded bore defined by the exterior hub. The set screw defined a tapered end which was received within a tapered opening formed in a key located in line with the threaded bore. This key was inserted between the end of the bore and the surface of the inner hub. As the set screw was rotated, the degree of pressure applied by the key on the inner hub could be adjusted whereby an extremely secure relationship between the hubs was said to be achieved.

Maurey in U.S. Pat. No. 3,815,432 patented June 11, 1974 provided a pulley construction wherein a pair of flange members were mounted on a shaft, and wherein the hub of one flange member was received within the hub of the other flange member. The flange members were adjustably secured on the shaft whereby the size of the belt receiving groove between the flange members could be changed. The securing means took the form of a wedge defining side edges, and channels which were defined in the hub for receiving the wedge. A set screw was receivable within an opening defined by one hub and within an aligned opening defined by the wedge. The wedge was preferably split so that movement of the set screw within the wedge opening operated to drive the wedge sections into engagement with the adjacent channel faces thereby tying the hubs together. A separate opening could be provided in either hub for receiving a set screw which served to tie the assembly of flange members against movement relative to the shaft.

Thus, the hereinabove described conventional adjustable control pulleys generally took the form of a movable pulley face having a sleeve-type bushing usually made of metal and/or plastic fixed in its hub which is axially slidable on a hollow metal shaft toward and away from a fixed pulley face. A control rod or shaft had one end rotatably supported within the hollow shaft by either a single or a two-row type ball bearing. The control rod projected from the hollow shaft and was threadedly connected to the movable pulley face so that it could be adjustably positioned relative to the fixed pulley face.

Deficiencies of the Prior Art

The foregoing pulley construction of the prior art is relatively difficult to manufacture, since the sleeve-type bushing, the inner surface of the hub of the movable pulley face and the hollow supporting shaft must be carefully formed to close dimensional tolerances in order that the control shaft will be concentric in the hollow shaft and will run true in the single or two-row ball bearing. During operation of such a pulley, the drive belt exerts a cocking force on the movable pulley face. If the movable pulley face is somewhat loose on the hollow supporting shaft, either because of machining inaccuracies or simply because of bushing wear, the cocking force will be transmitted to the control shaft causing it to deflect axially and to be misaligned in the ball bearing, thereby resulting in overheating of the bearing and premature failure. Furthermore, when the pulleys were disposed in a vertical orientation there was danger of accidental disassembly should a set screw become loosened.

SUMMARY OF THE INVENTION

Aims of the Invention

It is a general object of this invention to provide an improved pulley construction utilizing means for adjusting the pulley whereby the effective diameter of the pulley can be readily changed, and in which the chances of accidental disassembly are substantially reduced.

It is another object of this invention to provide a pulley construction of the type described which includes means for securely fastening the pulley to a shaft whereby the adjustable features can be obtained without sacrificing operating efficiency, and in which the chances of accidental disassembly are substantially avoided.

It is a still further object of this invention to provide a pulley construction which includes highly accessible and easily operable mechanisms for achieving adjustment of the pulley whereby the advantages of the pulley construction can be readily obtained, and in which the chances of accidental disassembly are substantially avoided.

It is yet another object of this invention to provide an improved design for variable pitch pulleys whereby the pulleys can be more efficiently employed in applications requiring a high load, and in which the chances of accidental disassembly are substantially avoided.

It is a still further object of this invention to provide an improved means for securing the pulley disc of variable speed pulleys whereby the likelihood of failure of the pulleys under high load conditions can be substantially reduced, and in which the chances of accidental disassembly are substantially avoided.

It is a still further object of this invention to provide an improved means for locking the hubs of pulley disc in variable pitch pulleys whereby the spacing between the pulley disc can be accurately maintained for extended periods of time under high load operating conditions, and in which the chances of accidental disassembly are substantially avoided.

A still further object of this invention is to provide an improved design for variable pitch pulleys including means to hold the various elements of the pulleys in place even if set screws primarily used to hold the elements of the pulley in place become loosened.

Still another object of this invention is to provide an improved design for variable pitch pulleys including means to hold the various elements of the pulleys in place and particularly to secure the key against motion along the keyway even if set screws primarily used to hold the elements of the pulley in place become loosened.

Statements of Invention

An improvement is provided herein by this invention in an adjustable pulley construction comprising a first disc having at least one belt-engaging surface and having an axially extending centrally located internally threaded annular hub, the hub having an interior flat face and an interior recess, a second disc defining at least one belt-engaging surface and having a centrally located externally threaded axle, the hub being coaxially and threadedly connected to the axle and being axially movable relative thereto, the belt-engaging surfaces being positioned in facing relationship whereby a pulley belt can be located therebetween. The improvement comprises means for securing the hub to the axle thereby to maintain a desired spaced relationship between the belt-engaging surfaces, the securing means including a threaded bore provided in the hub, the bore being transverse to the axle, a set screw received in the bore, a longitudinal axially extending keyway recess in the hub communicating with the threaded bore, a keyway land provided on the axle adapted to be located in line with the set screw, and a generally H-shaped key having a rectangular body and a pair of arms positioned between the bore in the hub and the keyway land of the axle, the thickness of the key relative to the depth of the keyway recess being so related that the key may be positioned completely within the keyway recess, thereby allowing the hub to be rotated relative to the axle, the key being urgeable out of the keyway recess and into contact with the keyway land, thereby preventing the hub from being rotated relative to the axle, the key having a clamping base defined by the rectangular body for engagement with the set screw, turning of the set screw operating to move the end of the set screw relative to the key to provide a frictional clamping action of the key onto the keyway land, a first arm of the H-shaped key projecting outwardly beyond the exterior flat face of the hub, a second arm of the H-shaped key projecting inwardly into the interior recess and the length of the arms being greater than the width of the keyway recess, thereby to retain the key within the recess upon removal of the screw.

This invention also provides a double adjustable pulley by providing the second disc with a pair of oppositely extending, externally threaded axles; and by including a pair of the first discs, each being secured on an associated one of the externally threaded axles in the manner as described above with the above described interrelationship between the key, the keyway recess, the keyway land and the arms of the key relative to the hub.

Other Features of the Invention

By one feature thereof, the H-shaped key is disposed so that the second arm of the key projects inwardly into an inner recess of the hub.

By another feature, the pulley construction includes at least two keyway lands on the axle.

By yet another feature, the pulley construction includes a second threaded transverse bore provided in the hub diametrically opposite the first-mentioned transverse bore, a second set screw received in the second bore, and a second keyway land is provided on the axle diametrically opposed to the first-mentioned keyway land, whereby turning of the second set screw operates to move the end of the set screw relative to the second keyway land to provide a reinforcing frictional engagement between the set screw and the second keyway land.

By yet another feature, the set screws are provided with knurled cup points.

By a still further feature, a second keyway recess is provided in the hub communicating with the second threaded bore, a second set screw is received in the second bore, and a second key is provided in the second recess the second key being interrelated to the keyway recess, the keyway land, and to the hub in the manner as described above, so that turning of the second set screw operates to move the end of the set screw relative to the second key to provide a frictional clamping action of the second key to the second keyway land.

By a still further feature, the pulley construction includes a third threaded transverse bore in the hub, a third set screw and a third keyway land on the axle, whereby turning of the third set screw operates to move the end of the set screw relative to the third keyway land, to provide a further reinforcing engagement between the set screw and the third keyway land.

By yet a further feature, the pulley construction includes a second threaded transverse bore provided in the hub diametrically opposite the first-mentioned transverse bore, a second set screw received in the second bore, and a second keyway land provided on the axle diametrically opposed to the first-mentioned keyway land, so that turning of the second set screw provides a reinforcing frictional engagement between the set screw and the second keyway land.

By a still further feature, the pulley construction includes a second threaded transverse bore provided in the hub diametrically opposite the first-mentioned transverse bore, a second keyway recess is provided in the hub communicating with the second threaded bore, a second set screw received in the second bore, a second keyway land provided on the axle diametrically opposed to the first-mentioned keyway land, and a second key is provided in the second recess, a third threaded transverse bore in the hub, a third set screw and a third keyway land on the axle so that turning of the third set screw operates to move the end of the set screw relative to the third keyway land to provide a reinforcing frictional engagement between the set screw and the third keyway land.

By yet a further feature, each keyway land is formed by removing a portion of the externally threaded axle to provide a flat surface for engagement with the key.

BRIEF DESCRIPTION OF THE DRAWINGS

In the accompanying drawings,

FIG. 5 is an exploded detail view illustrating a double pulley construction of a second embodiment of the invention;

FIG. 6 is a perspective view of the double pulley construction of FIG. 5; and

FIG. 7 is a vertical sectional view illustrating a double pulley of the embodiment of the invention shown in FIG. 5.

DESCRIPTION OF PREFERRED EMBODIMENTS

Description of FIGS. 1-4

Figure 1:
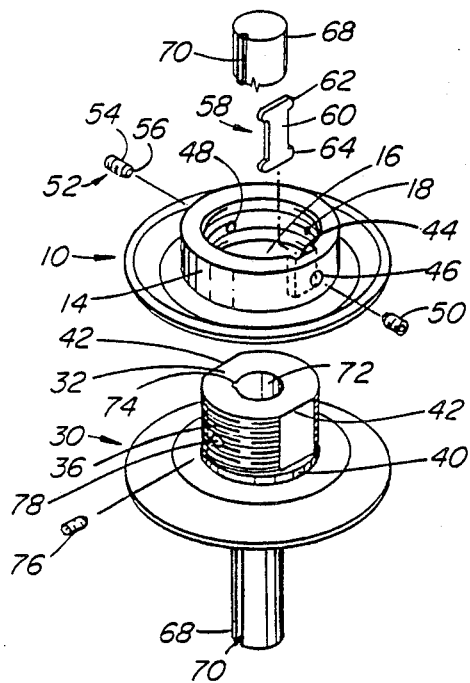
FIG. 1 is an exploded detail view illustrating a single pulley construction of one embodiment of the invention.

As seen in FIGS. 1-4, the pulley construction of this invention is a single adjustable pulley comprising a disc 10 having an annular hub portion 14, the central opening 16 thereof being internally threaded at 18. The inner end of the annular hub 14 is provided with an inner recess 20 whose purpose will be explained hereinafter.

Disc 10 is mounted on a second disc 30 having axle portions 32,33 extending axially therefrom. The axle portions 32,33 are provided with external threads 36,37, which terminate in unthreaded portion 40 adjacent the disc 30. The axle 32 is provided with a pair of diametrically opposed seats or lands 42, whose purpose will be explained hereinafter. The disc 10 can therefore be attached to disc 30, with the annular hub 14 bieng located in coaxial relationship to the axle 32, and with the hub 14 bieng rotatable relative to the axle 32 for axial movement, thereby adjusting the spacing of the discs 10,30.

The hub 14 is secured to the axle 32 by a novel set of coacting elements. The hub 14 is provided with an axially extending recess 44 communicating with a first internally threaded transverse bore 46 in the hub 14. A second internally threaded transverse bore 48 is provided in the hub 14 diametrically opposed to the first transverse bore 46. Set screws 50,52 are inserted in bores 46,48. The set screws 50,52 are preferably those having a threaded main cylindrical body portion 54, and a knurled cup point 56.

Figure 2:
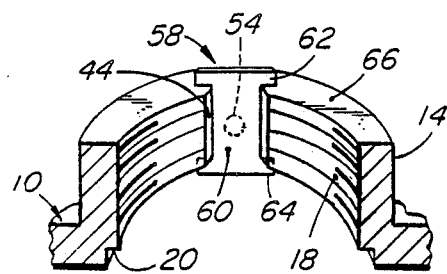
FIG. 2 is an enlarged fragmentary view of a portion of the pulley construction showing the operation of the H-shaped key.
Figure 3:
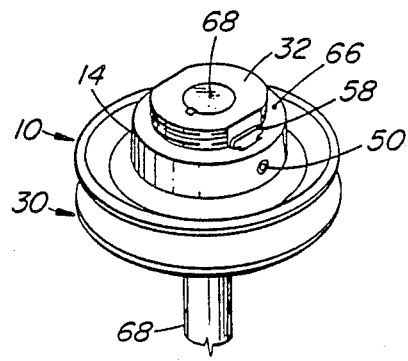
FIG. 3 is a perspective view of the single pulley construction of the embodiment of the invention shown in FIG. 1.
Figure 4:
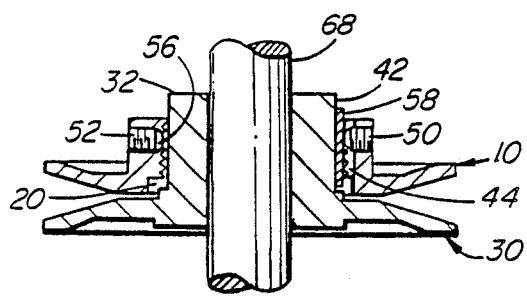
FIG. 4 is a vertical sectional view illustrating a single pulley of the embodiment of the invention shown in FIG. 1.

A key 58 is provided as an H-shaped block having a rectangular body 60 and a pair of arms 62,64. The key 58 is so disposed in the recess 44 that the body 60 is within the recess, and arm 62 rests on the exterior flat face 66 of the hub 14, with arm 64 within inner recess 20 of the hub 14 (as shown in FIG. 2).

Description of FIGS. 5-7

The drawings in FIGS. 5-7 show another embodiment of the invention to provide a double pulley. Since the elements to provide a single pulley are the same as heretofore described for FIGS. 1-4 only the additional elements will be described here.

a second movable disc 11 having an annular hub portion 15, the central opening 17 thereof being internally threaded at 19. The inner end of annular hub 17 is also provided with an inner recess 21.

Disc 11 is mounted on the second, i.e., a centrally located disc 30, on the housing axle portion 33 extending axially outwardly therefrom. The axle portion 33 is externally threaded at 37 which terminates in unthreaded portion 41 adjacent disc 30. Axle 33 is provided with a pair of diametrically opposed sets of lands 43. Disc 11 can therefore be attached to disc 30 with the annular hub 15 being located in coaxial relationship to the axle 33, and with the hub 15 being rotatable thereby adjusting the spacing relative to the axle 33 for axial movement between discs 11,30. In preferred used, the hubs 14,15 will be adjusted for the same spacing relative to the axles 32,33, whereby pulley belts (not shown) will transmit the same driving action.

The hub 15 is likewise provided with an axially extending recess 45 communicating with a first internally threaded transverse bore 47 in the hub 15. A second internally threaded transverse bore 49 is provided in the hub 15, diametrically opposed to the first transverse bore 47. Set screws 51,53 are inserted in bores 47,49, the set screws being the same as set screws 50,52 previously described.

A key 59 is provided as an H-shaped block having a rectangular body 61 and a pair of arms 63,65. The key 59 is so disposed in the recess 45 that the body 61 is within the recess and the arm 63 rests on the exterior flat face 67 of the hub 15 with the arm 65 within inner recess 21 of the hub 15.

OPERATION OF PREFERRED EMBODIMENTS

Operation of Embodiment of FIGS. 1-4

In the use of the securing means of this invention, the disc 30 is first secured to shaft 68 (provided with axial key 70) by passing the shaft 68 through central aperture 72 in axle 32 with key 70 in keyway slot 74. This holds the disc 30 against rotational movement relative to the shaft 68. Axial movement is prevented by means of set screw 76 passing through threaded bore 78 in axle 32 being secured with its end in tight frictional engagement with the shaft 68. In the event that the shaft 68 is of large diameter, the set screw 76 extends above the circumferential edge of the axle 32. In such event, the upper end of the set screw 76 may enter the inner recess 20 of the hub.

The spacing between the belt-engaging faces of discs 10,30 may be adjusted by changing the axial distance between discs 10,30. This spacing, of course, determines the speed imparted to the driven pulley by the drive belts (e.g., V-belts) entraining the drive pulley of this invention and a driven pulley.

The structure of this embodiment of this invention provides an extremely convenient means for the user of the pulley to make such necessary adjustment. The manufacturer assembles the pulley structure with the spacing between discs 10,30 in any arbitrary relationship, and with the key 58 in the recess 44. The key 58 in the recess 44 is opposite a land 42, and the set screw 50 is inserted against the key 58, with set screw 52 inserted against the dimetrically opposed land 42.

In order to adjust the spacing, set screw 50 is loosened to permit key 58 to enter completely into recess 44, and set screw 52 is also loosened. This permits disc 10 to be rotated on the threads 18 without interference by key 58, with one flat face of key 58 in contact with the base of recess 44 and with the other flat face of key 58 out of frictional engagement with the flat face of a land 42. When the disc 10 is rotated to provide the desired pulley width, the set screw 50 is rotated until it applies a pressure to one face of key 58 to urge it out of keyway recess 44 and into frictional engagement with the flat face of land 42. The other set screw 52 is rotated until it applies a frictional engagement of its knurled cup point 56 directly against the flat face of the other land 42. Thus, a balanced locking pressure is achieved by means of frictional action between the knurled cup point of the set screw and the key or land.

Operation of Embodiment of FIGS. 5–7

The assembly of the hub 15 to axle 33 is the same as described above for hub 14 and axle 32, and the manner of adjustment is also the same. Thus the operation of this embodiment is the same as for the first embodiment.

SUMMARY

While these embodiments of the invention have been described for the use of one key aligned with one land and one set screw aligned with a diametrically opposed land, other variations may be used. Thus, two keys and two set screws may be used instead of one key and one set screw to provide even greater and positive securement. In addition, more than two lands may be provided, with the only criterion being that there must be sufficient cylindrical surface on the axle to provide an adequate length of threads to hold the hub to the axle. Thus, if four lands were provided, then fine adjustments may be made by means of one-quarter of a turn, rather than by means of one-half a turn as described.

It has been found that the pulley of embodiments of this invention can transmit higher power without damage to the adjustability feature. Thus, even with a motor of 20 horsepower per pulley, the necessary torque on the set screw holding the key to the land is sufficient that the key does not move out of the land and thereby damage the thread and/or become loose. This provides a more secure engagement of the movable disc to the fixed disc. Moreover, in a vertical orientation, and using the H-shaped keys, even loosening of the set screws does not result in a complete disassembly of the pulley.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and "intended" to be within the full range of equivalence of the following claims.

We claim:

1. In an adjustable pulley construction comprising a first disc having at least one belt-engaging surface and having an axially extending centrally located internally threaded annular hub, said hub having an exterior flat face and an interior recess, a second disc defining at least one belt-engaging surface and having a centrally located externally threaded axle, said hub being coaxially and threadedly connected to said axle and being axially movable relative thereto, said belt-engaging surface being positioned in facing relationship, whereby a pulley belt can be located therebetween, the improvement comprising means securing said hub to said axle thereby to maintain a desired spaced relationship between said belt-engaging surfaces, said securing means including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw.

2. An adjustable pulley construction in accordance with claim 1 wherein said H-shaped key is disposed so that the second arm of said key projects inwardly into an inner recess of said hub.

3. The adjustable pulley construction of claim 2 including at least two said keyway lands on said axle.

4. The adjustable pulley construction of claim 2 including a second threaded transverse bore provided in said hub diametrically opposite said first-mentioned transverse bore, a second set screw received in said second bore, and a second keyway land provided on said axle diametrically opposed to said first-mentioned keyway land, whereby turning of said second set screw operates to move the end of the set screw relative to said second keyway land, to provide a reinforcing frictional engagement between said set screw and said second keyway land.

5. The adjustable pulley construction of claim 1 wherein said set screws are provided with knurled cup points.

6. The adjustable pulley of claim 4 wherein a second longitudinal axially-extending keyway recess is provided in said hub communicating with said second threaded bore, wherein a second set screw is received in said second threaded bore, and wherein a second H-shaped key having a rectangular body and a pair of arms is provided in said second recess, the thickness of said second key relative to the depth of said second keyway recess being so related that said second key may be positioned completely within said second keyway recess, thereby allowing said hub to be rotated relative to said axle, said second key being urgeable out of said second keyway recess and into contact with said second keyway land, thereby preventing said hub from being rotated relative to said axle, whereby turning of said second set screw operates to move the end of said second set screw relative to said second key to provide a clamping action of said second key onto said second keyway land, a first arm of said H-shaped key projecting outwardly beyond the free exterior flat face of said hub, a second arm of said H-shaped key projecting inwardly into said interior recess and the length of said arms being greater than the width of said keyway recess, thereby to retain said key within said recess upon removal of said screw.

7. The adjustable pulley construction of claim 4 including a third threaded transverse bore in said hub, a third set screw and a third keyway land on said axle, whereby turning of said third set screw operates to move the end of said set screw relative to said third keyway land, to provide a further reinforcing engagement between said set screw and said third keyway land.

8. The adjustable pulley construction of claim 4 including at least two said keyway lands on said axle.

9. The adjustable pulley construction of claim 6 including a third threaded transverse bore in said hub, a third set screw and a third keyway land on said axle, whereby turning of said third set screw operates to move the end of said set screw relative to said third keyway land, to provide a further reinforcing engagement between said set screw and said third keyway land.

10. A construction in accordance with claim 1 wherein each said keyway land is formed by removing a portion of said externally threaded axle to provide a flat surface for engagement with said key.

11. A construction in accordance with claim 1 wherein said second disc includes a pair of oppositely extending, externally threaded axles; and including a pair of said first discs, each of said first discs being secured on an associated one of said externally threaded axles, the improvement comprising: means securing each of said pair of said first discs including a threaded bore provided in said hub, said bore being transverse to said axle, a set screw received in said bore, a longitudinal keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess, and the length of said arms being greater than the width of said keyway recess, thereby to retain said key within said recess upon removal of said screw.

12. A construction in accordance with claim 2 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with set screw, and a generally H-shaped key having a rectangular body and a pair of arms positioned between said bore in said hub and said keyland of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

13. A construction in acccordance with claim 3 wherein said second disc includes a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between the bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

14. A construction in accordance with claim 4 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitidinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

15. A construction in accordance with claim 5 wherein said second disc includes a pair of oppositely extending, externally threaded axles, and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

16. A construction in accordance with claim 6 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

17. A construction in accordance with claim 7 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

18. A construction in accordance with claim 8 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

19. A construction in accordance with claim 9 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeble out of said key recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the free exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

20. A construction in accordance with claim 10 wherein said second disc includes a pair of oppositely extending, externally threaded axles; and including a pair of said first discs, each of said first discs being secured on an associated one of said externally threaded axles, the improvement comprising: means securing each of said pair of first discs including a threaded bore provided in said hub, said bore being transverse to said axle, a set screw received in said bore, a longitudinal, axially-extending, keyway recess in said hub communicating with said threaded bore, a keyway land provided on said axle adapted to be located in line with said set screw, and a generally H-shaped key having a rectangular body and a pair of arms positioned between said bore in said hub and said keyway land of said axle, the thickness of said key relative to the depth of said keyway recess being so related that said key may be positioned completely within said keyway recess, thereby allowing said hub to be rotated relative to said axle, said key being urgeable out of said keyway recess and into contact with said keyway land, thereby preventing said hub from being rotated relative to said axle, said key having a clamping base defined by said rectangular body for engagement with said set screw, turning of said set screw operating to move the end of said set screw relative to said key to provide a frictional clamping action of said key onto said keyway land, a first arm of said H-shaped key projecting outwardly beyond the exterior flat face of said hub, a second arm of said H-shaped key projecting inwardly into said interior recess and the length of said arms being greater than the width of said keyway recess, thereby to retain said key within said recess upon removal of said screw, whereby a pair of adjustable pulley constructions are provided.

* * * * *

UNITED STATES PATENT AND TRADEMARK OFFICE
CERTIFICATE OF CORRECTION

PATENT NO. : 4,504,249
DATED : Mar. 12, 1985
INVENTOR(S) : Yvon Fortier and Jean-Pierre Fortier It is certified that error appears in the above—identified patent and that said Letters Patent is hereby corrected as shown below:

Column 1, line 58, delete "dics" and insert --discs--.

Column 2, line 20, delete "this" and insert --This--.

Signed and Sealed this

Thirtieth Day of July 1985

[SEAL]

Attest:

DONALD J. QUIGG

Attesting Officer     Acting Commissioner of Patents and Trademarks